US 6,647,658 B1

(12) United States Patent
Park

(10) Patent No.: US 6,647,658 B1
(45) Date of Patent: Nov. 18, 2003

(54) FISHING ROD SUPPORT FOR SEMI-AUTO HOOKING

(76) Inventor: Yong Kil Park, 953 Helen Ave., Apt. 2, Sunnyvale, CA (US) 94806

( * ) Notice: Subject to any disclaimer, the term of this patent is extended or adjusted under 35 U.S.C. 154(b) by 0 days.

(21) Appl. No.: 10/246,939

(22) Filed: Sep. 20, 2002

(51) Int. Cl.[7] ............................................. A01K 97/12
(52) U.S. Cl. ............................. 43/15; 43/16; 43/21.2
(58) Field of Search .......................... 43/15, 16, 21.2, 43/18.1, 19.2, 17

(56) References Cited

U.S. PATENT DOCUMENTS

| 3,055,136 A | * | 9/1962 | Scott et al. | 43/15 |
|---|---|---|---|---|
| 3,407,527 A | * | 10/1968 | Hill | 43/15 |
| 3,456,377 A | * | 7/1969 | Niles | 43/15 |
| 3,750,320 A | * | 8/1973 | Benedetti | 43/15 |
| 3,832,794 A | * | 9/1974 | Encinias | 43/15 |
| 3,914,894 A | * | 10/1975 | Kobza | 43/15 |
| 4,656,776 A | * | 4/1987 | Macachor | 43/43.12 |
| 4,676,018 A | * | 6/1987 | Kimball | 43/15 |
| 4,730,408 A | * | 3/1988 | Miller | 43/15 |
| 5,097,618 A | * | 3/1992 | Stoffel | 43/17 |
| 5,245,778 A | * | 9/1993 | Gallegos et al. | 43/15 |
| 5,279,064 A | * | 1/1994 | Jaeger | 43/21.2 |
| 5,542,205 A | * | 8/1996 | Updike | 43/15 |
| 5,570,534 A | * | 11/1996 | Ford | 43/19.2 |
| 5,682,703 A | * | 11/1997 | Corbiere | 43/17 |
| 5,873,181 A | * | 2/1999 | Miyasaki | 34/470 |
| 5,881,488 A | * | 3/1999 | Canepa | 43/4.5 |
| 5,890,312 A | * | 4/1999 | Ball | 43/16 |
| 6,430,864 B1 | * | 8/2002 | Thomure et al. | 43/15 |
| 6,463,691 B1 | * | 10/2002 | Atkins | 43/17 |

* cited by examiner

Primary Examiner—Michael J. Carone
Assistant Examiner—Susan Piascik

(57) ABSTRACT

A novel "Y" shaped fishing rod support for a novel semi-automatic fishing is comprised of, including but not limited to, an anchoring pole, a straight means of partially cut-out metal pipe consisting the upper part of the fishing rod support, a fishing rod holder guide, a fishing rod holder pivotally engaged in between the "Y" shaped cleavage that is formed between the upper part of the fishing rod support and the fishing rod holder guide, a spring which connects the fishing rod holder and the vertical upper part of the fishing rod support, and an electric trigger operated by a fisherman. The lower part of the straightening means is constructed of a narrow metal pipe. The upper part of the straightening means is constructed of a metal pipe, which is larger in diameter than the metal pipe consisting the lower part of the straightening means. An anchoring pole, which has a sharp bottom tip for anchoring the "Y" shaped fishing rod support to the soft soil around a lake or to rocks on a water shore. An "L" shaped clamp is pivotally attached to the lower Part of the straightening means for attaching the fishing rod support to a porch. The upper portion of the metal pipe is a hemi-pipe, to eable to receive the fishing rod holder. The lower portion is a whole pipe A pin, that is attached to the out side of the fishing rod holder, is engaged to an electric trigger, located at the outer bottom of the rod holder support. The trigger is actuated by the decision of the fisher to avoid unnecessary hooking.

1 Claim, 5 Drawing Sheets

FISHING ROD SUPPORT FOR SEMI-AUTO HOOKING

This invention relates to a fishing rod support enabling semi-automatic fishing for a fisher.

FIELD OF THE INVENTION

A novel a "Y" shaped fishing rod support is comprised of pole, a spring and an electric trigger actuated by a fisherman enabling a semi-automatic fishing.

DESCRIPTION OF THE PRIOR ARTS

For industrial fishing ships, various automatic systems of jigging and trolling are introduced.

For personal automatic fishing, two types of mechanism were available: (1) One type takes advantage of the elasticity of the fishing rod itself; (2) The other type utilizes a spring installed fishing rod support and triggers are actuated by the tension of the fishing line. The latter type is closer to this invention than the former.

U.S. Pat. No. 3,798,821 to Bybee, U.S. Pat. No. 4,085,536 to Wood, Jr., U.S. Pat. No. 4,197,668 to McKinsey, U.S. Pat. No. 4,397,113 to Pinson, U.S. Pat. No. 4,627,186 to Wang, U.S. Pat. No. 4,676,018 to Kimball, U.S. Pat. No. 4,730,408 to Miller, and U.S. Pat. No. 5,076,001 to Coon, et al. illustrate automatic-hooking mechanisms for fishing rods utilizing a spring engaged rod support.

Bybee's invention (,821) utilizes upward spring force actuated by "L" type cam section, which is released when a fish pulls downward the hook. Wood, Jr.'s invention (,536) utilizes the resilient force of a single looped spring and a stopper installed on the fishing line. McKinsey's aufofishing instrument (,668) is comprised of a fishing rod support connected to a spring, which pulls down the pivotally installed rod support when a strike is censored by the line tension. This actuates a crane-like trigger to release the latch and the shoulder from the bearing. This pivotally supports rod in an engaged position. Pinson's invention (,113) is composed of a fishing rod support pivotally mounted on an anchoring pole and a spring. which connect the pole and the rod's handle cup of the support. A trigger is actuated by the tension of the fishing line. Wang's automatic fishing machine (,186) includes a casing, an electromagnet switch having a micro switch wound by a fishing line, a rod clamp equipped with a tension spring and a fulcrum for supporting fishing rod. The micro switch is triggered to actuate the electro magnet switch to raise the rod. Kimbell (,018) illustrated a fishing rod holder including a mount, a support, and a rod handle holder which is spring biased relative to the support. A releasing pin which is connected to a fishing line-response lever retains the rod holder. Miller (,408) illustrated another fishing rod support for automatic fishing. A stake driven into the ground supports a pivot arm on which the rod is held. A trip lever is released by a trigger wire when the fishing line is tensioned. A spring then pivots the arm upward. Coone et al. (,001) illustate a single looped spring actuated automatic fishing rod holder. A trigger, attached at the head of the spring, is released when the fishing line is pulled to the front side.

All of the prior arts are focused on automatic fishing. Therefore, the triggers for hooking actuates automatically what ever the origin of the force applied to the trigger. The other drawback of the prior arts is the mechanism by which the spring and the rod holder works. When the hooking is actuated, the end of the rod holder will hurt the fisher if the fisher stays behind. The fisher's hand also may be jammed between the spring exposed.

None of the prior arts illustrates such simple, safe and novel method of semi-auto fishing mechanism of this invention.

SUMMARY OF THE INVENTION

Therefore, it is the purpose of this invention to provide a novel, easy and safe semi-auto hooking device for a personal fishing rod. A novel "Y" shaped fishing rod support for this purpose is comprised of an anchoring pole, a straight means of partially cut-out metal pipe consisting the upper part of the fishing rod support, a fishing rod holder guide, a fishing rod holder pivotally engaged in between the "Y" shaped cleavage that is formed between the upper part of the fishing rod support and the fishing rod holder guide, a spring which connects the fishing rod holder and the vertical upper part of the fishing rod support, and an electric trigger and actuator operated by a fisherman. The lower part of the straightening means is constructed of a narrow metal pipe. The upper part of the straightening means is constructed of a metal pipe. which is larger in diameter than the metal pipe consisting the lower part of the straightening means. An anchoring, pole which has a sharp bottom tip for anchoring the "Y" shaped fishing rod support to the soft soil around a lake or to rocks on a water shore. An "L" shaped clamp is pivotally attached to the lower part of the straightening means for attaching the fishing rod support to a porch. The upper portion of the metal pipe is a hemi-pipe, so that it is able to receive the fishing rod holder. The lower portion is whole pipe. A pin, that is attached to the outside of the fishing rod holder, is engaged to an electric trigger, which is located at the outer bottom of the rod holder support. The trigger is connected to a [12-volt battery] and is actuated by the decision of the fisherman to avoid unnecessary hooking. When the trigger is actuated, the engaged pin is released and the spring pulls the fishing rod holder to an upright position.

DETAILED DESCRIPTION OF THE PREFERRED EMBODIMENTS

Figure 1:
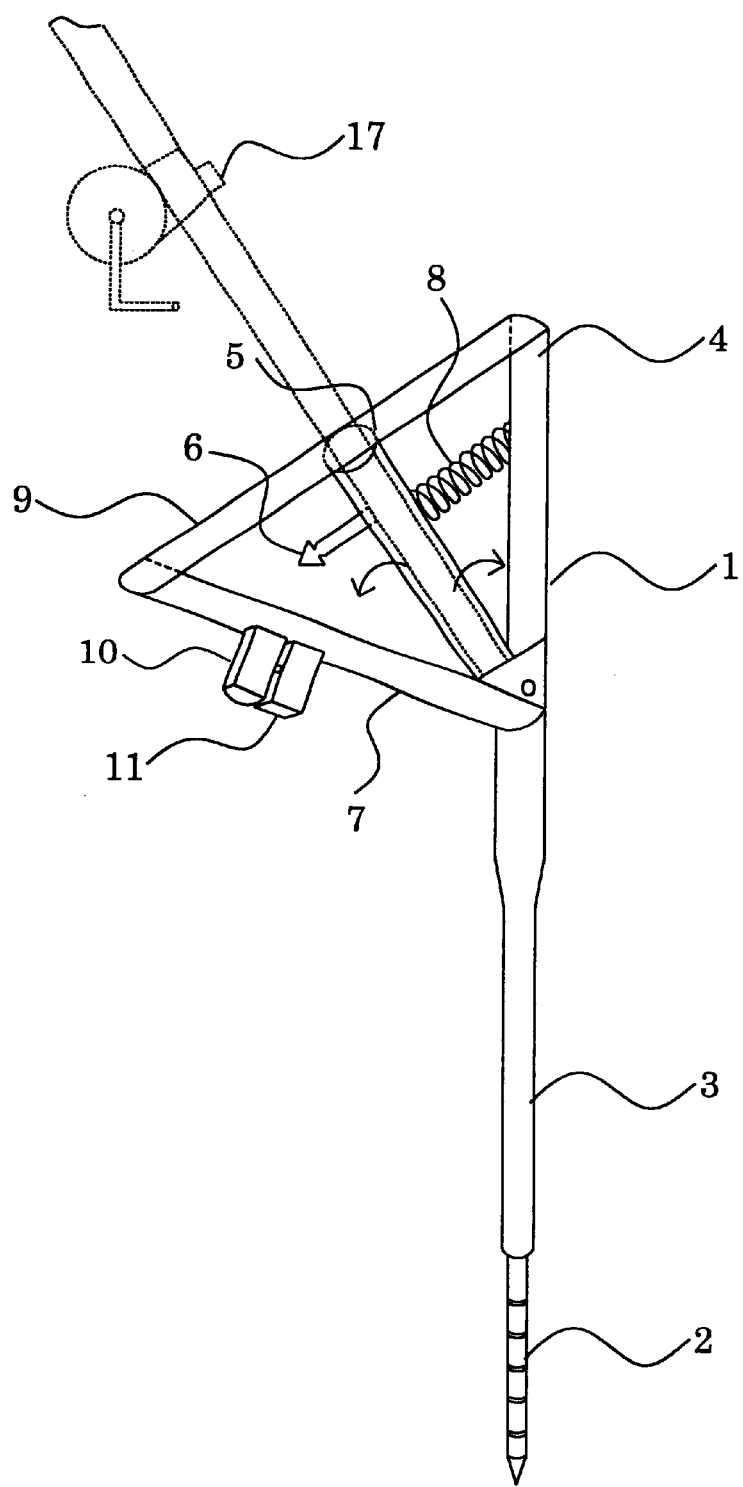
FIG. 1 is a perspective view of the "Y" shape fishing rod support of this invention.
Figure 2:
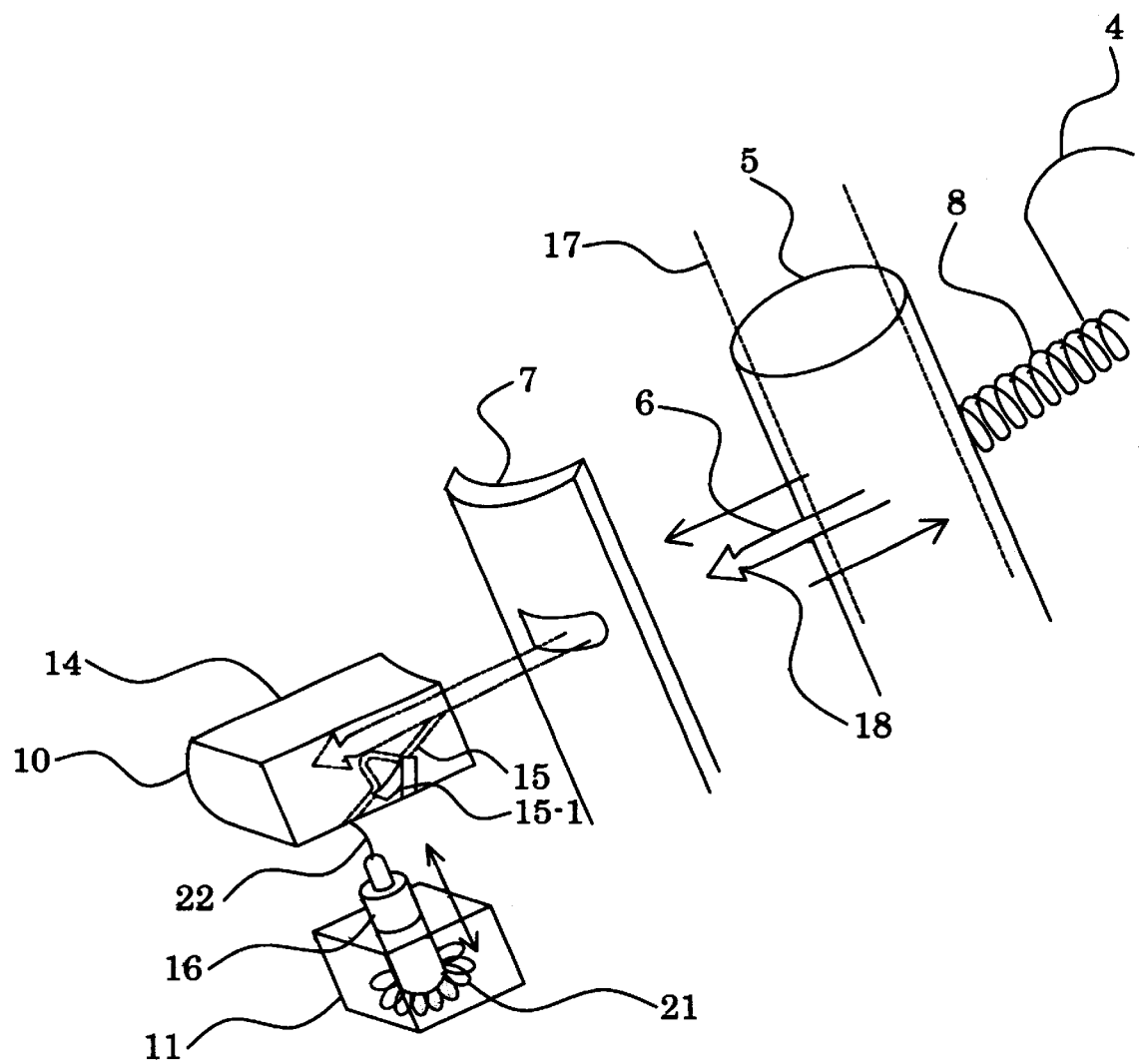
FIG. 2 is a schematic assembly drawing of the "Y" shape fishing rod support, a rod holder, a spring, a pin. and an actuator.
Figure 3:
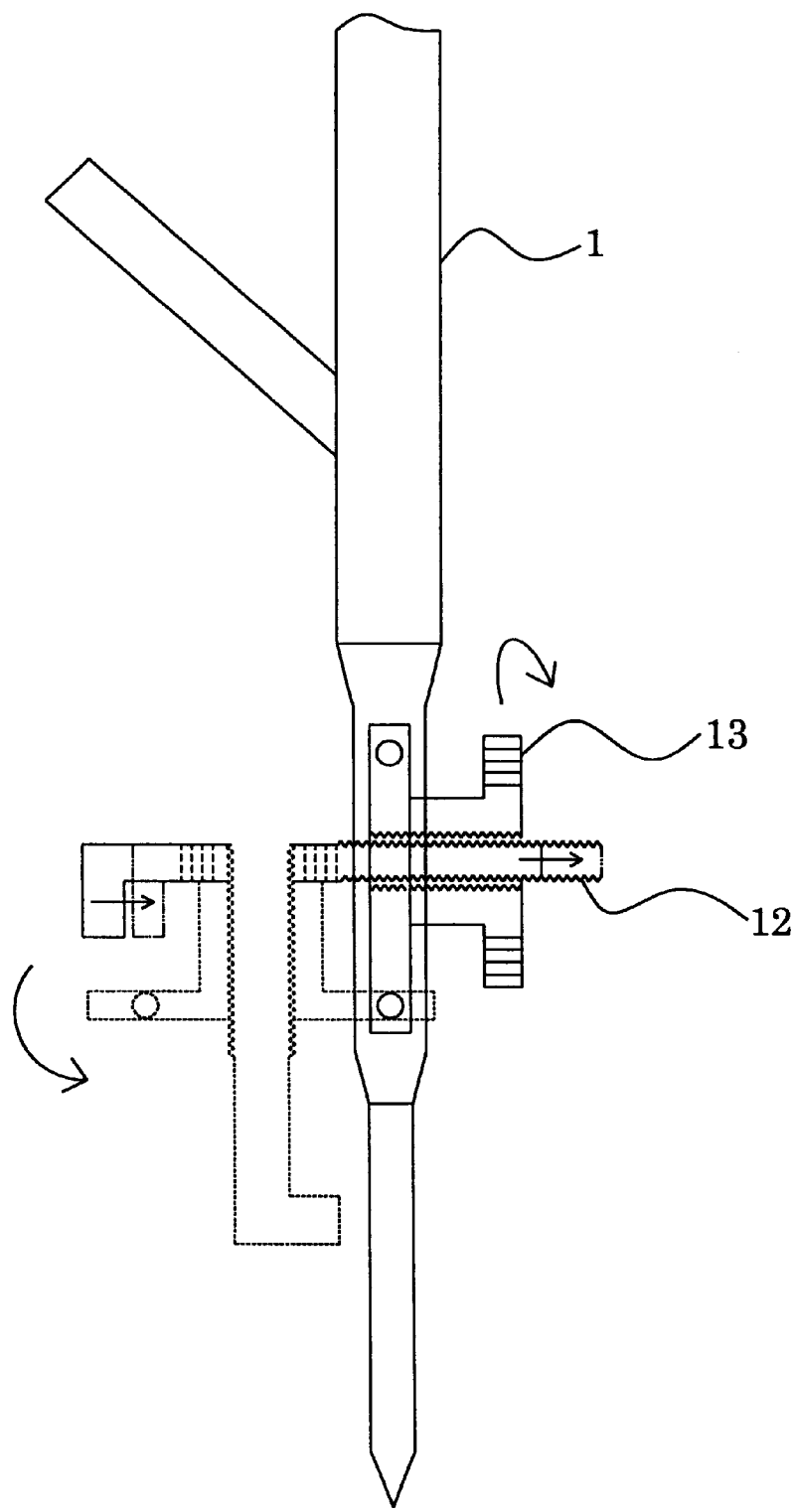
FIG. 3 is an "L" type clamp for affixing the support to a fence.

FIG. 1 is a perspective view of the "Y" shape fishing rod support of this invention. FIG. 2 is a schematic assembly drawing of the "Y" shape fishing rod support, the rod holder, spring, pin, and actuator. The fishing rod support (1) is consisted of an anchoring pole (2), a lower part (3) made of iron pipe connecting the anchor and upper part (4), a fishing rod holder (5), a trigger pin (6), a fishing rod holder guide (7), a spring (8), two transparent and flexible rod holder side protectors (9), a trigger (10), and an actuator (11). Part of the upper part (4) is hemi-pipe to receive the fishing rod holder (5). A spring (8) connects the fishing rod holder (5) and inner side of the upper part (4). Load a fishing rod (17) onto the holder (5) and push the holder (5) to the fishing rod holder guide (7) direction. Then the trigger pin (6) is inserted into the trigger (10) and the ribbon (15) holds the neck (18) of the trigger pin (6). The trigger (10) and the actuator (11) are fixed at the outer surface of the rod holder guide (7). FIG. 3 is an "L" type clamp for affixing the support to a fence.

Figure 4:
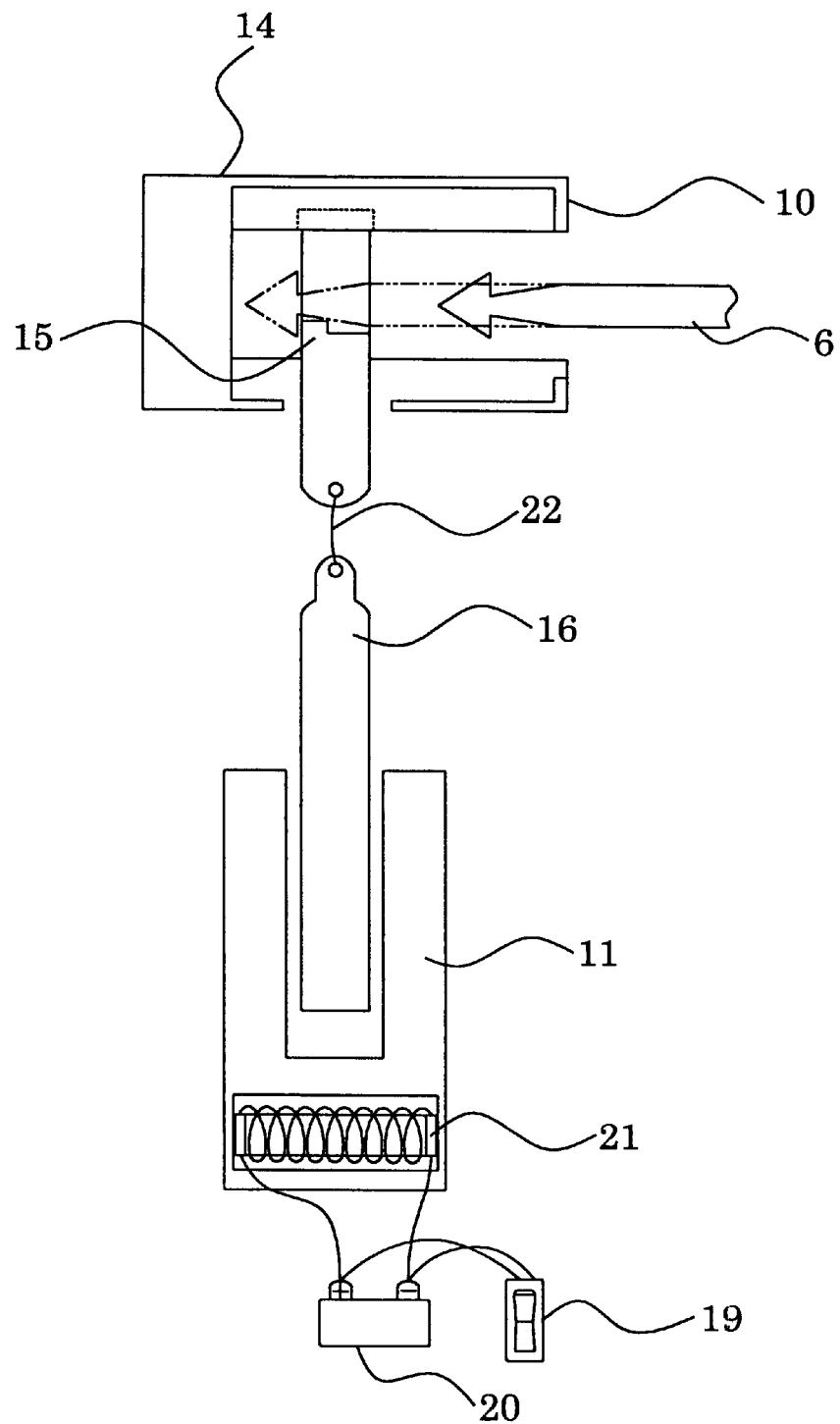
FIG. 4 is a side cross sectional view of the trigger and actuator of this invention.
Figure 5:
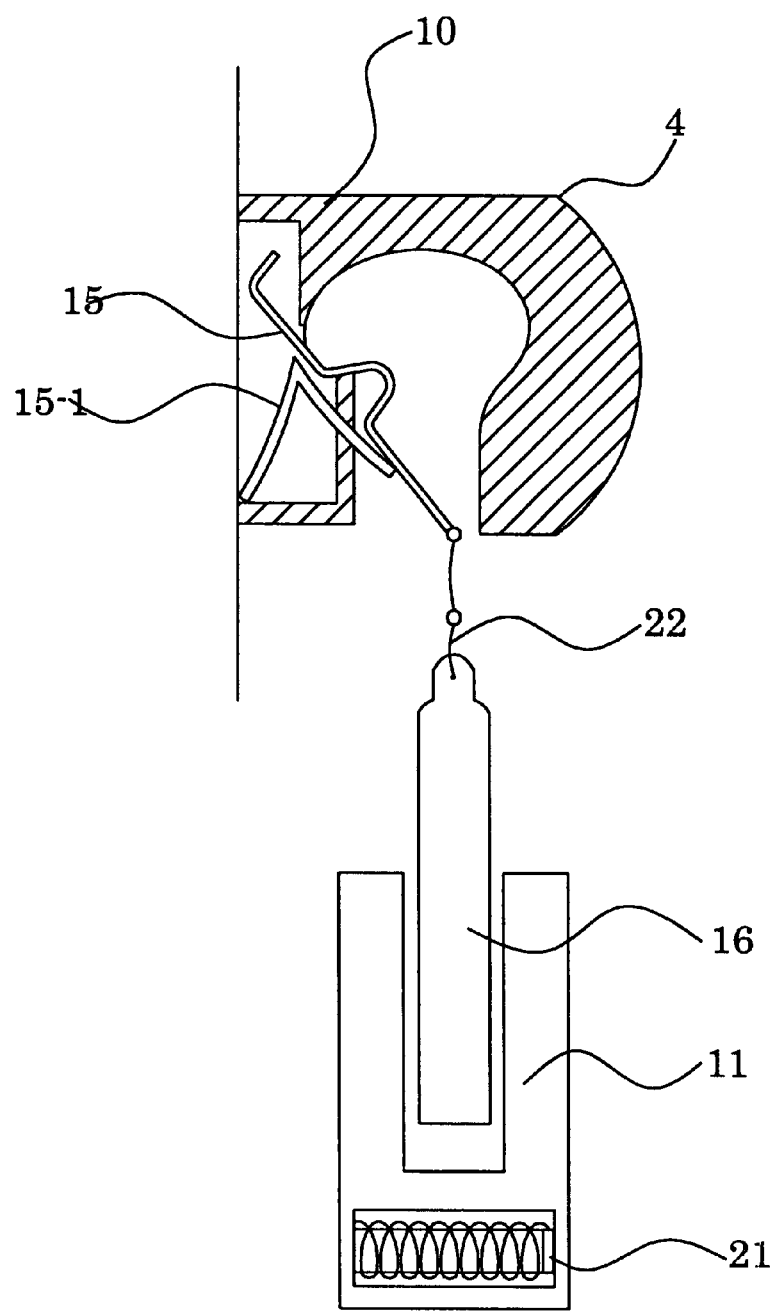
FIG. 5 is a front cross sectional view of the trigger and actuator.

FIG. 4 is a side cross sectional view of the trigger and actuator of this invention. FIG. 5 is a front cross sectional view of the trigger and actuator of this invention. The trigger (10) is comprised of a case (14), a metal ribbon (15) and ribbon spring (15-1). One end of the metal ribbon (13) is fixed to the inside of the case (12) and the other end is tensionally connected to a permanent magnet (16) by a wire (22). When a fisherman pushes the switch (19) of the actuator (11) that is connected to a battery (20) a sensing of a fish's bite, the electromagnet (21) at the bottom of the actuator (11) pulls down the permanent magnet rod (16) connected to the metal ribbon (15) by a metal wire (22). Then the metal ribbon (15) releases the trigger pin's neck (18) and the spring (8) spontaneously draws the rod holder (5) and fishing rod (17) to the upright position. This instantaneous movement makes a hook set on a fish.

A protector (9) in FIG. 1, made of a transparent flexible plastic material, covers both sides of the "Y" shape cleavage for preventing a fisherman from inserting a hand between the fishing rod holder (5) and the upper portion of the fishing rod support (4), which may result heart the hand when the trigger (10) is activated unintentionally.

What is claimed is:

1. A novel "Y" shaped personal fishing rod support for semi-automatic fishing, which is comprised of: 1) an anchoring pole having sharp bottom tip; 2) a straight means of partially cut-out metal pipe consisting the upper part of the fishing rod support; 3) another straight means of metal pipe consisting the lower part of the fishing rod support, which has a diameter larger than that of the anchoring pole but smaller than that of the metal pipe consisting the upper part of the fishing rod support; 4) a fishing rod holder guide, in a shape of a straight hemi-pipe, attached to the upper part of the fishing rod support with an inclined angle by welding it to the lower bottom portion of the cut-out part of the upper part of the fishing rod support; 5) a fishing rod holder pivotally engaged in between the "Y" shaped cleavage that is formed between the upper part of the fishing rod support and the fishing rod holder guide; 6) a spring which connects the fishing rod holder and the vertical upper part of the fishing rod support; 7) a protector made of a transparent flexible plastic material, which covers both sides of the "Y" shape cleavage; 8) an electric trigger comprised of a case, a metal ribbon, one end of which is fixed to the inside of the case and the other end is tensionally connected to a permanent magnet by a wire, a ribbon spring; 9) a trigger pin attached to the outer surface of the fishing rod holder pointing to the trigger; and 10) an actuator comprised of an electromagnet, which is connected to an outer power source, at the bottom of the actuator, a permanent magnet rod slidably inserted in the actuator body and connected to the metal ribbon by a metal wire.

* * * * *